(12) United States Patent
Baveja et al.

(10) Patent No.: US 10,230,642 B1
(45) Date of Patent: Mar. 12, 2019

(54) INTELLIGENT DATA PATHS FOR A NATIVE LOAD BALANCER

(71) Applicant: CISCO TECHNOLOGY, INC., San Jose, CA (US)

(72) Inventors: Avni Baveja, San Jose, CA (US); Mitali Parthasarathy, Sunnyvale, CA (US); Samar Sharma, San Jose, CA (US); Mouli Vytla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 15/067,019

(22) Filed: Mar. 10, 2016

Related U.S. Application Data

(60) Provisional application No. 62/152,020, filed on Apr. 23, 2015, provisional application No. 62/152,000, filed on Apr. 23, 2015.

(51) Int. Cl.
*H04L 12/743* (2013.01)
*H04L 12/819* (2013.01)
*H04L 12/931* (2013.01)
*H04L 12/803* (2013.01)

(52) U.S. Cl.
CPC .......... *H04L 47/21* (2013.01); *H04L 45/7457* (2013.01); *H04L 47/125* (2013.01); *H04L 49/354* (2013.01)

(58) Field of Classification Search
CPC ... H04L 45/7457; H04L 47/125; H04L 47/21; H04L 49/354
See application file for complete search history.

(56) References Cited

U.S. PATENT DOCUMENTS

| | | | |
|---|---|---|---|
| 8,601,084 B2 | 12/2013 | Carlander | |
| 2006/0095968 A1* | 5/2006 | Portolani | H04L 63/0218 726/23 |
| 2009/0041011 A1* | 2/2009 | Sheppard | H04L 63/306 370/360 |
| 2009/0304007 A1* | 12/2009 | Tanaka | H04L 12/4645 370/395.53 |
| 2014/0307553 A1* | 10/2014 | Fung | H04L 47/125 370/235 |
| 2014/0321462 A1* | 10/2014 | Kancherla | H04L 45/72 370/389 |
| 2015/0207741 A1* | 7/2015 | Luo | H04L 45/52 370/235 |

* cited by examiner

*Primary Examiner* — Ayaz R Sheikh
*Assistant Examiner* — Hai-Chang Hsiung

(57) ABSTRACT

In an example, there is disclosed a network apparatus for providing native load balancing within a switch, including: a first network interface operable to communicatively couple to a first network; a plurality of second network interfaces operable to communicatively couple to a second network; one or more logic elements comprising a switching engine operable for providing network switching; a content-addressable memory (CAM); and one or more logic elements providing a load balancing engine operable for: receiving incoming network traffic via the first network; selecting the incoming network traffic based at least in part on a selection factor, and load balancing selected traffic to a first egress interface based at least in part on a load balancing factor other than an IP address.

20 Claims, 8 Drawing Sheets

ROUTING TABLE
400

| TRAFFIC BUCKET | NODE |
|---|---|
| B0 | N0 |
| B1 | N1 |
| B2 | N2 |
| B3 | N3 |
| B4 | N0 |
| B5 | N1 |
| B6 | N2 |
| B7 | N3 |

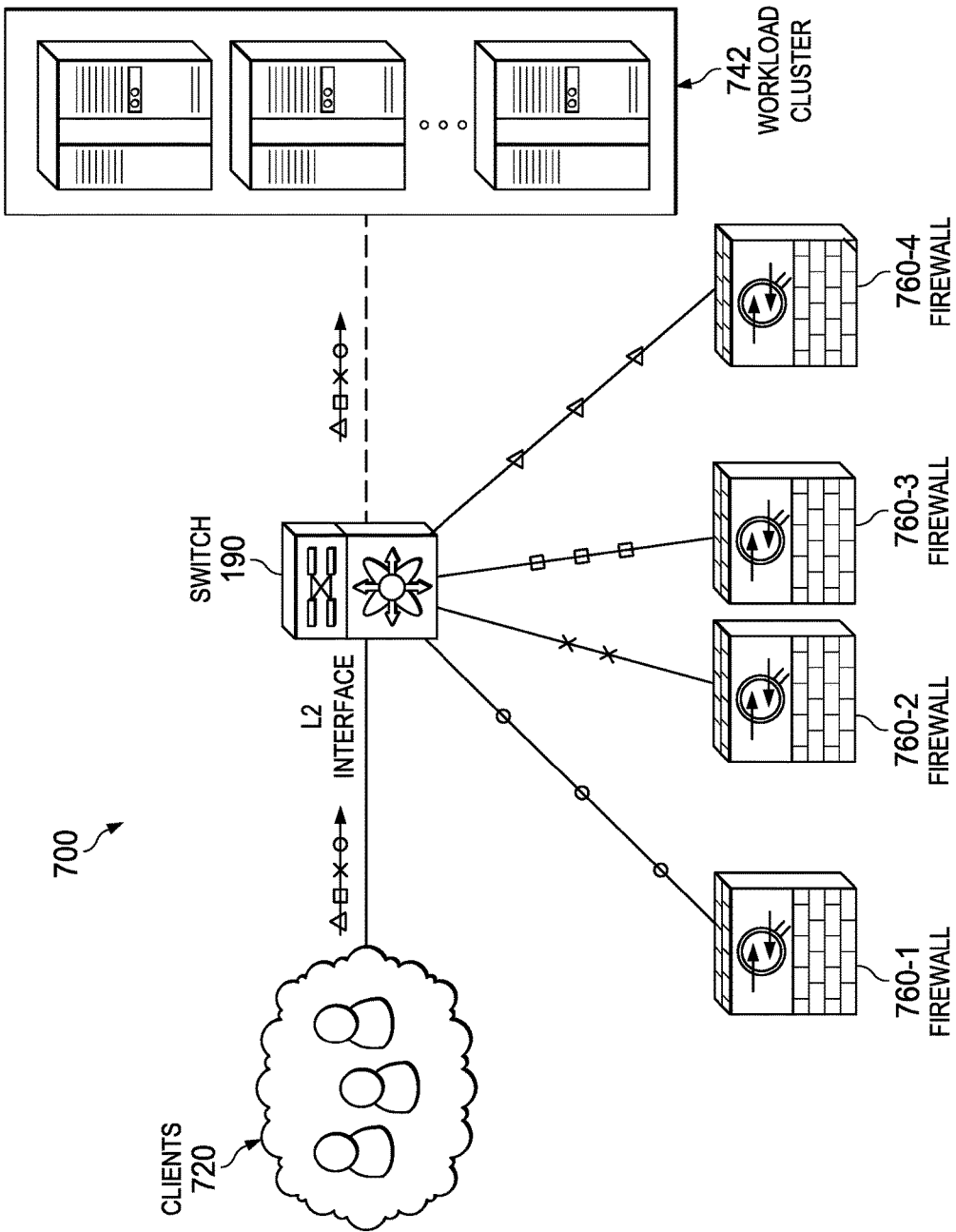

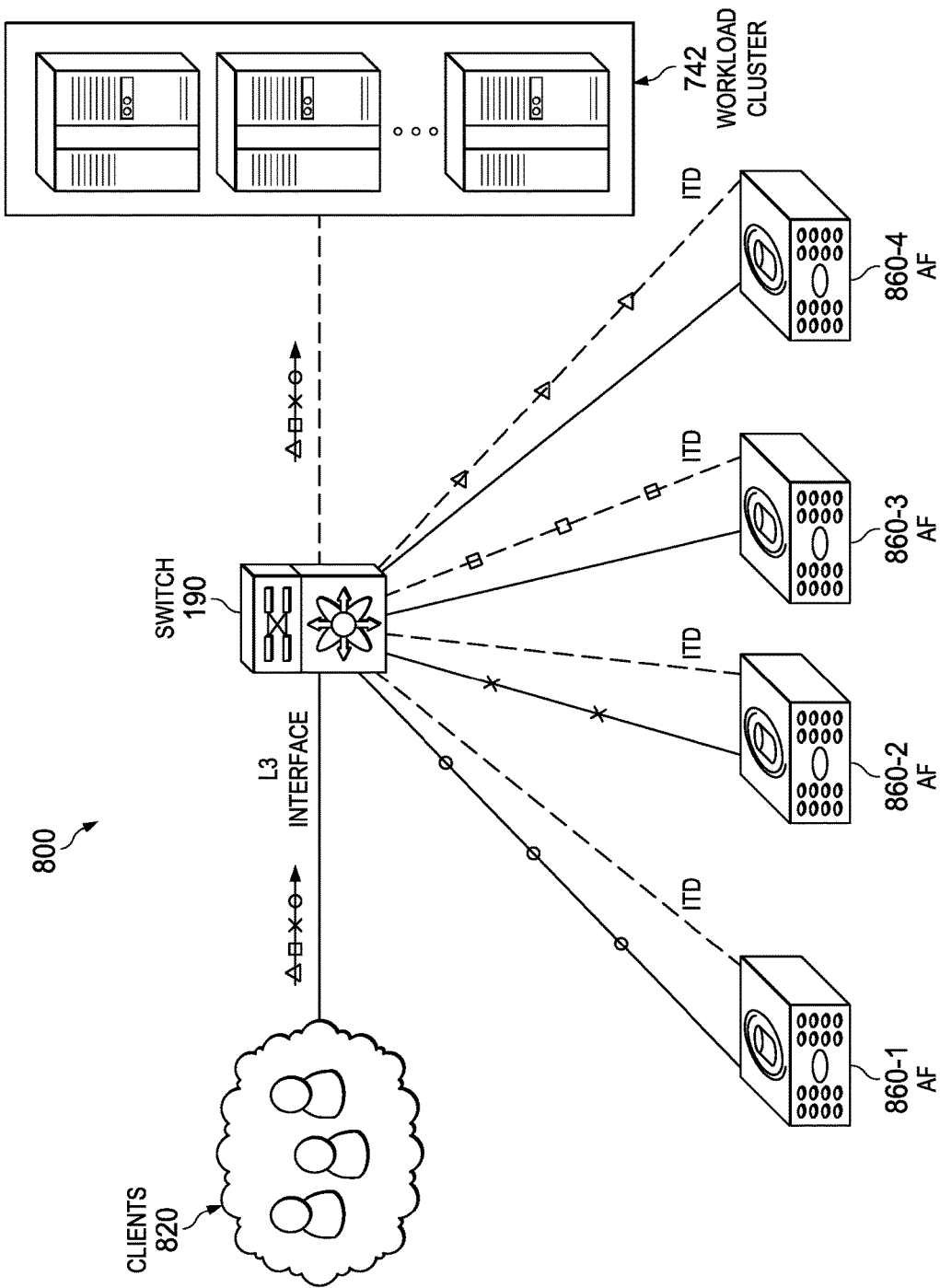

INTELLIGENT DATA PATHS FOR A NATIVE LOAD BALANCER

CROSS-REFERENCE TO RELATED APPLICATIONS

This application claims the benefit of priority under 35 U.S.C. § 119(e) to U.S. Provisional Application Ser. No. 62/152,020 entitled "INTELLIGENT DATA PATH LOAD BALANCER IN LAYER 2 DOMAIN," filed on Apr. 23, 2015, and U.S. Provisional Application Ser. No. 62/152,000 entitled "NATIVE LOAD BALANCING ON A NETWORK SWITCH," filed on Apr. 23, 2015, which are hereby incorporated by reference in their entirety.

FIELD OF THE DISCLOSURE

This disclosure relates in general to the field of communications and, more particularly, to providing intelligent data paths for a native load balancer.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In another example, the dimensions of the various features may be arbitrarily increased or reduced for clarity of discussion.

FIG. 7 is a block diagram of a method according to one or more examples of the present Specification.

FIG. 8 is a block diagram of a layer 2 (L2) network according to one or more examples of the present Specification.

SUMMARY

Figure 1A:
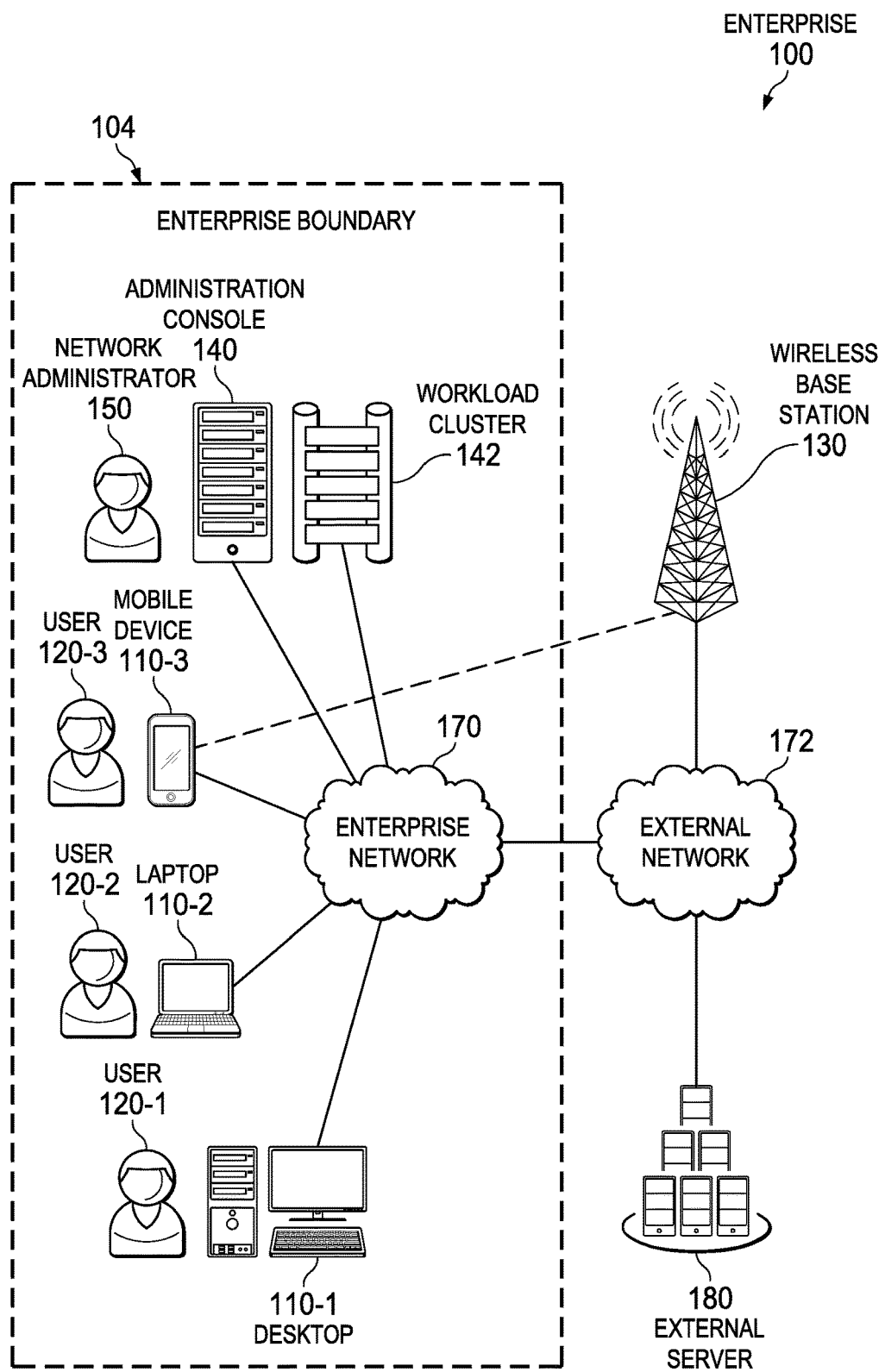
FIG. 1A is a network level diagram of an enterprise computing environment according to one or more examples of the present Specification.

In an example, there is disclosed a network apparatus for providing native load balancing within a switch, including: a first network interface operable to communicatively couple to a first network; a plurality of second network interfaces operable to communicatively couple to a second network; one or more logic elements comprising a switching engine operable for providing network switching; a content-addressable memory (CAM); and one or more logic elements providing a load balancing engine operable for: receiving incoming network traffic via the first network; and load balancing selected traffic to a first egress interface based at least in part on a load balancing factor other than an IP address.

DETAILED DESCRIPTION OF THE EMBODIMENTS

The following disclosure provides many different embodiments, or examples, for implementing different features of the present disclosure.

In an example of a known computing system, a cluster of workload servers may be provisioned, either as physical servers or as virtual machines, to provide a desired feature to end-users or clients. To provide just one nonlimiting example, the workload servers may provide a website. When a plurality of users make a large number of simultaneous connections to the website, it is necessary to appropriately distribute the workload among the various servers in the server farm.

To this end, incoming traffic from client devices may be routed to a network switch. The network switch may then forward the traffic to a load balancer. An example of a commonly used load balancer is a network appliance or virtual appliance running a Linux operating system and provided with a full network stack, as well as load-balancing logic for determining which server to send the traffic to.

For example, a workload cluster may include 16 nodes, either physical servers or virtual machines. The load balancer itself may also be either a physical appliance or a virtual appliance. Upon receiving a packet, the load balancer determines the load on each of the 16 workload servers. The load balancer then applies an algorithm to determine an appropriate node for handling the traffic. This may include, for example, identifying a least burdened node and assigning the traffic to that node. Each node may have its own IP address, which in one embodiment is not exposed to end-user client devices. Rather, client devices are aware only of the IP address of the load balancer itself. Thus, the load balancer may modify the packet header, for example, by assigning it to the virtual IP (VIP) of one of the workload servers. The load balancer may then return the packet to the switch, which routes the packet to the appropriate workload server.

In this example, the incoming packet transfers from the switch to the load balancer, which may provide the full OSI or TCP/IP 7-layer "stack" in software, operating on a full-featured operating system, such as Linux. Thus, the incoming packet is abstracted up to one of the upper layers of the OSI model, such as layer 6 or 7, so that it can be handled by the load-balancing software. The packet is then de-abstracted to a lower layer and returned to the switch, which forwards it to the appropriate workload server. Upon receiving the packet, the workload server again abstracts the packet up to one of the higher levels of the OSI model.

The inventors of the present Specification have recognized that the load balancer, and its overhead, represent a potential bottleneck that reduces the scalability of the network environment, and slows down handling of network traffic. The process of passing the packet up and down the OSI stack, in particular, while very fast from a human point of view, can be a significant bottleneck from the point of view of a network.

However, the named inventors of the present Application have recognized that a network device, such as a switch or a router, can be configured to natively act as a load balancer in addition to performing its ordinary network switching function. In that case, rather than provide a load-balancing algorithm in an application running on an operating system, the switch may provide load-balancing via a much faster solution, such as programmable hardware rather than a general purpose software-driven processor. This means that the load-balancing logic is handled mostly or entirely at the hardware level. Furthermore, the switch generally operates at lower levels of the OSI model, such as layers 1 and 2. Thus, it has reduced overhead in abstracting and de-abstracting packets through the OSI stack.

Thus, the switch itself becomes the load balancer, and rather than acting as a bottleneck, is capable of providing terabit-class bandwidth by operating at the hardware level.

In an example, a concept of traffic buckets and nodes is described. Traffic may be divided into "buckets." Each bucket may be assigned to a node.

A traffic bucket serves as a classifier for identifying a subset of traffic to be redirected. As many traffic buckets can be created as needed for granularity. For bucketization of traffic, various L2/L3 header fields can be used in the algorithm.

By selecting different fields, many buckets can be created. By way of example, we can use B0, B1, B2, B3, B4 . . . Bn to designate traffic buckets.

A traffic node serves as a "next-hop" for traffic forwarding. A node is an entity that has an associated IP address reachable from the switch. By way of example, we can use N0, N1, N2, N3 . . . Nn to designate nodes.

Mapping can be established to associate a traffic bucket to a node. This association creates a packet path for forwarding of traffic for each bucket. This can include one-to-one mapping of a traffic bucket to a node, or many-to-one mapping of traffic buckets to a node (i.e., multiple nodes may be assigned to a single node).

This architecture realizes substantial advantages over certain existing deployments. For example, some existing load balancers suffer from shortcomings such as inefficiency and expense. In one example, a low capacity load-balancer provides approximately 40 Gbps, while a higher-end load balancer provides approximately 200 Gbps.

As discussed above, speed and scalability are enhanced by programming the load balancing engine in programmable hardware rather than in software running on a general-purpose processor programmed by software. Programmable hardware includes, for example, an application-specific integrated circuit (ASIC), field-programmable gate array (FPGA), programmable logic array (PLA), or similar. Because the logic is implemented directly in hardware, it can execute a "program" orders of magnitude faster than a CPU, which must fetch instructions from memory, and then run those instructions on general-purpose hardware. Furthermore, an operating system, multitasking, and multi-layer network stack introduce additional complexity that does not contribute directly to carrying out the load balancing function. In short, a software-programmable CPU is extremely versatile, and its function may be easily adapted to many different tasks, but it is relatively slow. A dedicated programmable hardware device, programmed only for a single function, is not versatile, but carries out its single, dedicated function very quickly.

In one example, a hardware-based load balancer of the present Specification must be able to handle both traffic that is to be load balanced, and traffic that does not require load balancing. For non-load-balanced traffic, the device should still perform its native function as a switch or router, and simply switch or route the traffic as appropriate.

To aid in this, and to preserve the speed advantage of the programmable hardware-based load balancing engine, it is advantageous not to store data values in standard memories such as random access memories (RAM), as this could negate the speed advantages of the hardware. Rather, in one example, a ternary content-addressable memory (TCAM) is provided, and may be capable of operating at speeds approaching the speed of the programmable hardware itself. A content-addressable memory (CAM) is a species of memory used in extremely high-speed searches, such as those necessary for native terabit-class load balancing. CAM compares the search input (tag) to a table of stored data, and returns the address of matching datum. This is in contrast to RAM, in which the program provides an address, and the RAM returns a value stored at that address. When a search is performed, if the CAM finds a match for the tag, the CAM returns the address of the tag, and optionally, the value of the tag as well. If the tag is not found, a "not found" value is returned. TCAM is a species of CAM, in which a tag can be searched not only for a binary "1" or "0," but also for a ternary "X" (don't care). In other words, the search tag "110X" matches both "1101" and "1100."

In the context of load balancing, a network administrator may configure a virtual IP (VIP) tag, including in one example an IP address, protocol, and port number. Entries may be made in the TCAM for VIP tags that are to be load balanced. Entries may also be made for a set of nodes that can receive traffic matching that VIP tag.

The switch advertises the VIP tag via routing protocols, and receives traffic destined for VIP. When traffic enters the switch or router, the VIP tag is checked against entries in the TCAM. If there is a matching entry, the traffic is to be load balanced. The traffic is then bucketized and load balanced to each node using TCAM entries.

This architecture realizes several important advantages. As servers move from 1 Gbps to 10 Gbps, traditional software load balancers have to scale appropriately. Load balancer appliances and service modules also consume rack-space, power, wiring and cost. However, in an embodiment of the present Specification:

Every port of a switch or router can act as a load-balancer.
No external appliance and no service module are needed.
The teachings of this Specification can be used to provide terabit-class load balancing.

Furthermore, scalability is greatly enhanced. Many network switches have the ability to modularly increase their size by adding on I/O modules. For example, a switch may have a baseline size of 48 ports, wherein each port can be connected to one physical server appliance. The physical server appliance may be a standalone appliance providing the workload service, or may be a server configured to provide a hypervisor and to launch instances of virtual machines on demand. If the 48 ports on the switch are exhausted, an additional I/O module, for example providing an additional 48 ports, may be added onto the switch. Thus, the switch can be scaled up to extremely large sizes with minimal configuration. The switch itself may be provided with a load-balancing engine, which in this case may include dedicated hardware, firmware, or very low-level software such as BIOS to provide the load-balancing logic.

In certain embodiments, challenges may be encountered when heterogeneous network elements make load balancing according to an IP address impractical. For example, in some networks, certain devices may be "transparent" nodes, or may operate exclusively in layer 2 (L2), so that they do not have an IP address, which in some embodiments is available only in layer 3 (L3) or above. This may occur, for example, in certain cases where portions of an intranet are provided strictly in L2, in which case a pure L2 subnetwork may be defined, as illustrated in FIG. 8. In other examples, a heterogeneous network may include an L3 boundary, as in FIG. 9, so that portions of the network are serviced in L2, and other portions are serviced in L3.

In such cases, an L2 load balancing switch may be provided to load balance traffic to nodes that lack traditional IP addresses or are operating in transparent mode. In an example, the method presented bypasses forwarding decisions and redirects the L2 traffic to a set of ports. Furthermore, the methods presented can select incoming traffic to be load balanced, based on factors such as VLAN, destination IP, or destination L4 port.

In L2 routing, several issues may arise, and in some embodiments, solving these issues simultaneously provides for the ability to perform enhanced hardware-based load balancing as described in this Specification. For example, a solution may need to simultaneously:

Bypass forwarding decisions and redirect L2 traffic to a particular set of ports.

Load balance the traffic among those ports based on one or more factors, including by way of nonlimiting example, source IP, destination IP, source L4 port, destination L4 port, protocol, source media access control (MAC) address, destination MAC address, virtual local area network (VLAN), virtual IP address (VIP).

Select incoming traffic to be load-balanced based on one or more factors other than IP address, such as VLAN, destination IP address, or destination L4 port by way of nonlimiting example.

Provide resiliency (e.g., if one ling goes down, then only flows going to that link are affected).

Scale up to many links for load balancing, such as 2048 in current high-end switches provided by Cisco®. This is in contrast to some existing solutions, such as Port Channel and equal-cost multi-path routing (ECMP), which scale to only 8 or 16 links in certain embodiments.

These issues may need to be solved in a pure L2 or partial-L2 network in which the nodes being load balanced are running in "transparent" mode, in which the appliance acts as a "bump" or "stealth" appliance, without an L3 IP address known to the switch. To that end, several solutions for L2 load balancing are described in this Specification. By way of nonlimiting example, these include:

a. Port-based.
b. VLAN-based.
c. VIP-based.
d. Protocol-based.
e. VLAN transition and redirection.
f. Destination MAC plus IP access control list (ACL).

In port-based load balancing, an access control list and redirect action are applied to the ingress port. The classification rule, in form of an ACL is applied to ingress traffic on a port, and once matched to user-specified parameters (load balancing criteria), the packet is redirected to another port. There are many options for matching of the packets. L3 parameters include IP address, port, protocol, TCP flags, and wild cards in source or destination IP or other fields, by way of nonlimiting example. L2 parameter include MAC address, specific bits in the source or destination MAC, wild cards in the source/destination MAC addresses, type, protocol, and VLAN ID tags, by way of nonlimiting example. A redirect rule may be configured in the TCAM, to match on L3 or L2 ACL, and redirect any matching traffic to a destination index or port on any line card in the system.

In VLAN-based load balancing, ingress traffic is selected according to its VLAN. A VLAN-level ACL is applied for all ingress traffic. However, because the ACL may not differentiate between ingress and egress traffic, circular routing may occur on return traffic. Thus, a per-port exclusion is provided, and the ingress port or ports are listed as excluded, thus ensuring that the traffic is not routed circularly. Per-port inclusion may also be used, in which case, all load balanced ports are provided on the include list.

In VIP-based balancing, traffic is selected based on VIP. For example, all traffic within VIP-1 is redirected to port 1 (eth 5/1), and all traffic with destination VIP-2 is redirected to port 2 (eth 1/1).

In protocol-based load balancing, a combination of destination protocol and/or port in the packet may be used to match the traffic, and then redirect to physical L2 ports. A decision may be based on the bucket and destination IP port it has matched. For example, all traffic with protocol TCP port 80 and bucket-1 is redirected to port 1 (eth 5/1). All traffic with protocol TCP port 80 and bucket-2 is redirected to port 2 (eth 1/1).

In VLAN translation and redirection, traffic may be selected based on its VLAN, and then translated into a different VLAN. The incoming traffic ingresses on any port belonging to a VLAN. TCAM entries are created for all member ports of the VLAN (a port group). Once traffic is matched based a user-specified rules and a redirect rule is applied, the VLAN is rewritten to map to the destination VLAN. On the return path, the VLAN is rewritten back to the original VLAN for the port group.

In destination MAC plus IP ACL load balancing, the MAC address of L2 devices can be retrieved automatically because the L2 devices are directly connected. On the switch, a MAC address table may be used, or the ACL may be manually configured. This can be used in the load balancing decision to redirect packets to ports.

A system and method for native load balancing on a switch will now be described with more particular reference to the attached FIGURES. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

In some embodiments, hyphenated reference numerals, such as 10-1 and 10-2, may be used to refer to multiple instances of the same or a similar item 10, or to different species of a genus 10.

FIG. 1A is a network-level diagram of a secured enterprise 100 according to one or more examples of the present Specification. In the example of FIG. 1, a plurality of users 120 operates a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be any suitable computing devices. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

A network administrator 150 may operate an administration console 140 to administer a workload cluster 142 and to otherwise configure and enforce enterprise computing and security policies.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, a wireless base station 130, and an external server 180 may be provided on external network 172, by way of nonlimiting example. Wireless base station 130 may be, for example, an LTE base station or other similar device that connects to mobile device 110-3 wirelessly. Wireless base station 130 may in turn communicatively couple to external network 172. External server 180 may be a server that provides web pages, data, or other resources that enterprise users 120 may need to use.

Figure 1B:
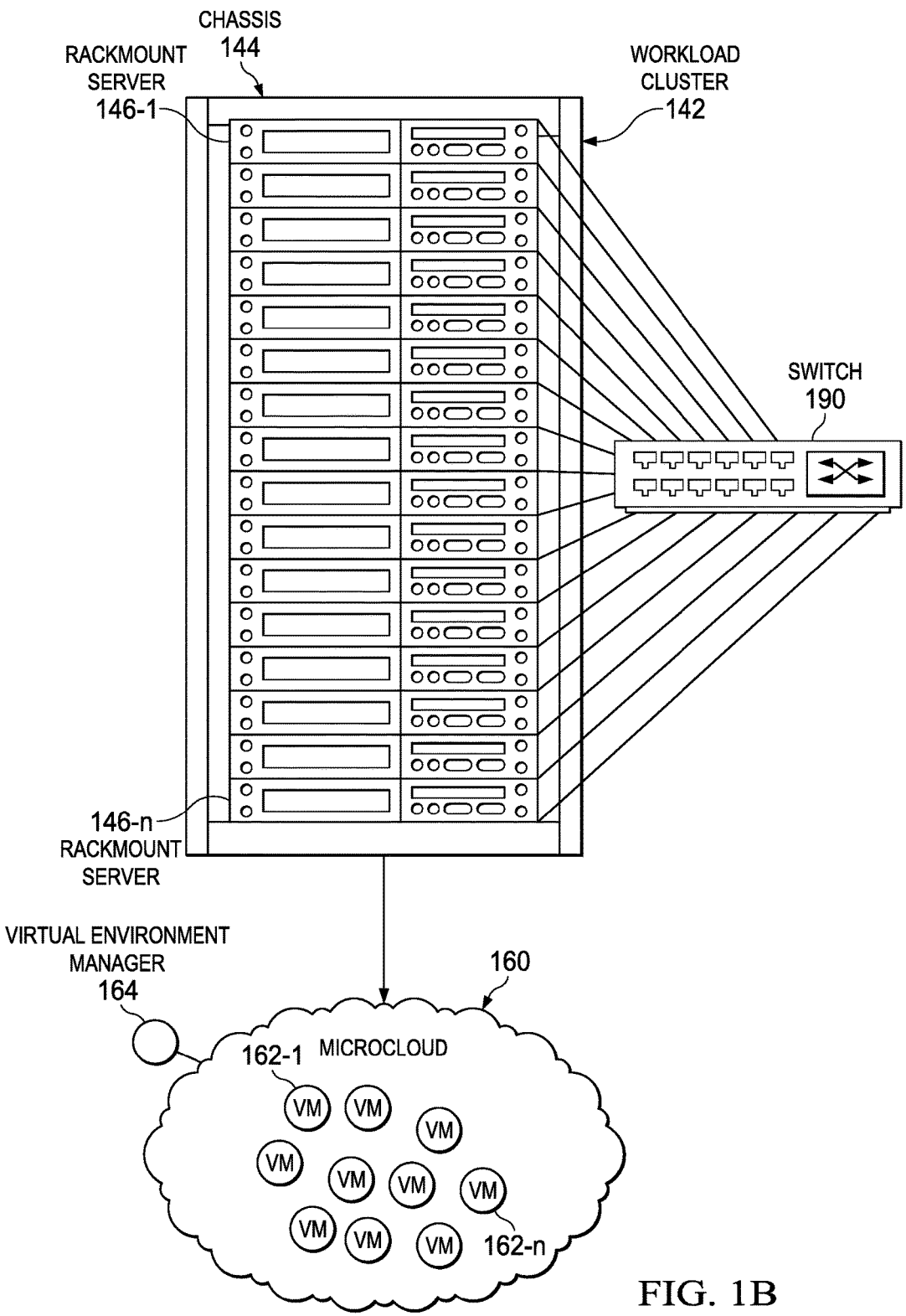
FIG. 1B is a more detailed view of a computing cluster according to one or more examples of the present Specification.

FIG. 1B is a block diagram disclosing a workload cluster 142 according to one or more examples of the present Specification. In this example, workload cluster 142 includes a rack mount chassis 144 which has installed therein a plurality of rack mount servers 146-1 through 146-N. Each rack mount server 146 may be a dedicated appliance, or may be configured with a hypervisor to launch one or more instances of a virtual client.

A switch 190 may be provided to communicatively couple workload cluster 142 to enterprise network 170. As described below, switch 190 may have a number of physical ports for communicatively coupling to rack mount servers 146. In an example, each server 146 has a physical wired connection, such as an Ethernet connection, to a single port of switch 190.

In some cases, some or all of rack mount servers 146-1 through 146-N are dedicated to providing a microcloud 160. Microcloud 160 may be a single purpose or dedicated cloud providing a particular service. For example, microcloud 160 may be configured to serve a website, provide communication systems such as one or more 4G LTE services, or any other appropriate service. In some cases, microcloud 160 is provided as a "tenant" on workload cluster 142. Workload cluster 142 may provide a virtual environment manager 164, which may be responsible for enforcing tenant boundaries between one or more microcloud tenants 160, and for dynamically provisioning virtual machines 162 as necessary. Virtual machines 162-1 through 162-N may represent a plurality of instances of a virtual server appliance. In some cases, VMs 162 may also be provided in different flavors. For example, some VMs 162 may be provisioned as firewalls, others may be provisioned as an antivirus scanning appliance, and yet others may provide other auxiliary functions, in addition to VMs 162 provisioned as workload servers.

When switch 190 is provisioned with a load-balancing engine, the load-balancing engine is responsible for keeping track of the number and virtual IP (VIP) of workload servers, so that it can properly route traffic to the workload servers. In the case where each rack mount server 146 is a standalone appliance, switch 190 may maintain a table of the VIP of each rack mount server 146. In cases where workload servers are provided in a microcloud 160, switch 190 may provide a table that maps the VIP of each VM to a VIP assigned to the physical rack mount server 146 on which that VM 162 resides. Thus, switch 190 may include logic not only for routing the packet to the correct rack mount server 146, but also for directing the packet to the correct VM 162 on that rack mount server 146.

FIGS. 2A and 2B show examples of a system architecture for providing service appliances in a network environment.

FIG. 2A is a simplified schematic diagram illustrating a physical view of a network infrastructure 200 for providing service appliances in a network environment. FIG. 2A includes a network (illustrated as multiple links 212) that connects one or more server farms 142-1 and 142-2 to one or more clients 110 via a cloud 210. Cloud 210 may encompass, for example, enterprise network 170 and external network 172 of FIG. 1. Individual servers in server farm 142-1 and 142-2 may communicate within the same farm via switches 190-1 and 190-2, respectively. Servers in server farm 142-1 may communicate with servers in server farm 142-2 via a switch 190 in this particular example implementation.

A service appliance 224 may connect to switch 190 over a communication channel 226 (for example, over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 190) to one or more receivers (e.g., service appliance 224). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of network infrastructure 200, communication channel 226 may be a single channel: deployed for both control messages (i.e., messages that include control packets) and data messages (i.e., messages that include data packets).

As used herein, a "service appliance" is a discrete (and generally separate) hardware device or virtual machine with integrated software (e.g., firmware), designed to provide one or more network services including load balancing, firewall, intrusion prevention, virtual private network (VPN), proxy, etc.

Figure 2:
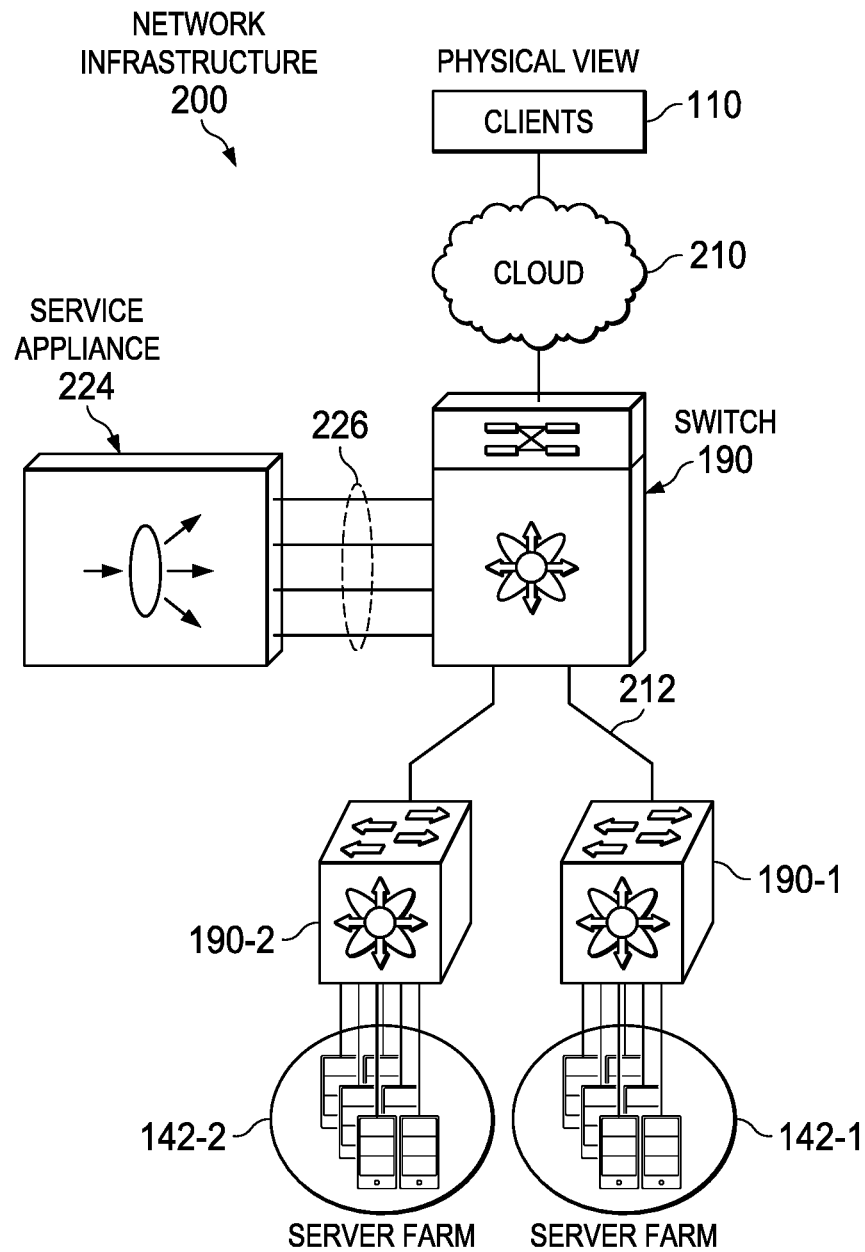
FIG. 2 is a is a simplified schematic diagram illustrating a physical view of a system for providing service appliances in a network environment according to one or more examples of the present Specification.

For purposes of illustrating the techniques of network infrastructure 200, it is important to understand the communications in a given system such as the system shown in FIGS. 1A and 2. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Some service appliances (e.g., load balancers) integrate services such as load balancing, firewall, intrusion prevention, VPN, etc. in a single box format, which is generally based on modular, scalable platforms and which provides a cost-effective option of the three options listed previously. Service appliances may be connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Specially designed high-performance routers may also provide network services. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards may be installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Switches in network infrastructure 200, including switches 190 (FIG. 1A), and 190-1, and 190-2 (FIG. 2), may include any type of network element connecting network segments. For example, switch 190 may include a multi-port network bridge that processes and routes data at a data link layer (Layer 2). In another example, switch 190 may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switch 190 may be integrated into other network devices such as gateways, routers, or servers. In various embodiments, switch 190 may be a managed switch (e.g., managed using a command line interface (CLI), a web interface, etc.).

Communication channel 226 may include a port-channel, which can encompass an aggregation of multiple physical interfaces into one logical interface, for example, to provide higher aggregated bandwidth, load balancing and link redundancy. Communication channel 226 with multiple links can provide a high availability channel: if one link fails, traffic previously carried on this link can be switched to the remaining links. Communication channel 226 may contain up to 16 physical communication links and may span multiple modules for added high availability. In one embodiment, communication channel 226 can represent a port-channel with an aggregation of four point-to-point communication links over multiple ports. In another embodiment, communication channel 226 can represent a virtual port-channel (vPC).

Although FIG. 2 shows server farms 142-1 and 142-2, it should be appreciated that network infrastructure 200 is not limited to servers. In fact, any network element may be connected to the network via appropriate switches, where these implementations may be based on particular needs. As used herein, the term "network element" is meant to encompass computers, virtual machines, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 142-1 and 142-2 may be replaced with LANs connecting desktop computers in a small office. In another example, server farms 142-1 and 142-2 may be replaced with a network of wireless communication devices. In yet another example, server farms 142-1 and 142-2 may be replaced with one or more supercomputers. Various other configurations and devices are contemplated within the broad framework of the present disclosure.

According to embodiments of the present disclosure, network infrastructure 200 may provide for a fabric extender (FEX)-like protocol, auto-discovery, message transport service (MTS)-like control messages, and defined messages between service appliance 224 and switch 190. Configuration of service appliance 224 may be performed on switch 190 as for a line card. Data path forwarding may be offloaded to network line cards in switch 190. Control path processing may be offloaded to a supervisor engine on switch 190 as appropriate. In embodiments where service appliance 224 has multiple virtual services (e.g., virtual machines), each virtual service may be a separate virtual line card on switch 190.

Figure 3:
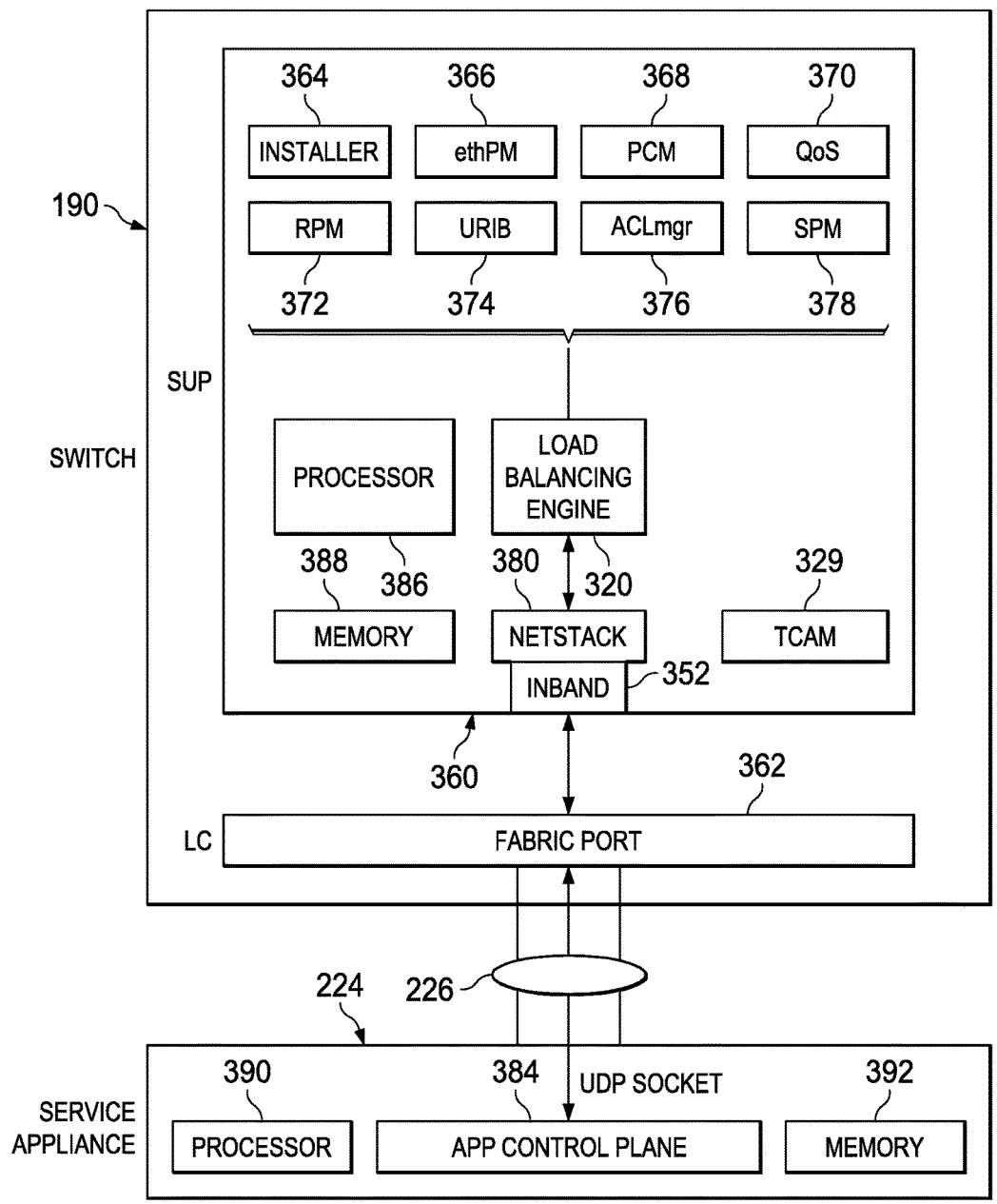
FIG. 3 is a block diagram of a network switch according to one or more examples of the present Specification.

FIG. 3 is a simplified block diagram illustrating example details of network infrastructure 200 according to embodiments of the present disclosure. Switch 190 may include a processor 386 and a memory 388. A supervisor engine 360 on switch 190 may communicate with service appliance 224 via a line card including a fabric port 362 that connects point-to-point to a node on service appliance 224. Supervisor engine 360 may include several modules such as an installer 364, an Ethernet port manager (ethPM) 366, a port-channel manager (PCM) 368, a Quality of Service (QoS) element 370, a route policy manager (RPM) 372, a unified/unicast routing information base (URIB) 374, an access control list manager (ACLmgr) 376, and a service policy manager (SPM) 378 for performing various routing and/or management functions.

Service appliance 224 may include, by way of nonlimiting example, a processor 390, an application control plane 384, and a memory 392. Application control plane may communicate with switch 190 via communication channel 226, which may include for example a UDP socket.

In various embodiments, service appliance 224 may support stream control transmission protocol (SCTP) with various addresses (e.g., 127 addresses). In the absence of native SCTP support in supervisor engine 360, tunneling over UDP may be enforced to send SCTP packets. A Netstack module 380 may be provisioned in supervisor engine 360 for implementing TCP/IP stack for received frames hitting the control-plane of supervisor engine 360. Supervisor engine 360 may be configured with an inband port 352, which may be a virtual port that provides an interface for management traffic (such as auto-discovery) to a management processor such as a processor 386.

Each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 386 may be treated as only one core of a multi-core processor, or may be treated as the entire multi-core processor, as appropriate. In some embodiments, one or more co-processors may also be provided for specialized or support functions. In some examples, the processor is a programmable hardware device, which in this Specification expressly excludes a general-purpose CPU.

Load balancing engine 320, in one example, is operable to carry out computer-implemented methods as described in this Specification. Load balancing engine 320 may include one or more processors, and one or more non-transitory computer-readable mediums having stored thereon executable instructions operable to instruct a processor to provide load balancing. As used throughout this Specification, an "engine" includes any combination of one or more logic elements, of similar or dissimilar species, operable for and configured to perform one or more methods provided by load balancing engine 320. Thus, load balancing engine 320 may comprise one or more logic elements configured to provide methods as disclosed in this Specification. In some cases, load balancing engine 320 may include a special integrated circuit designed to carry out a method or a part thereof, and may also include software instructions operable to instruct a processor to perform the method. In some cases, load balancing engine 320 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that load balancing engine 320 may also include other hardware and software, including configuration files, registry entries, and interactive or user-mode software by way of non-limiting example.

In one example, load balancing engine 320 includes executable instructions stored on a non-transitory medium operable to perform a method according to this Specification. At an appropriate time, such as upon booting switch 190, or upon a command from the operating system or a user, the processor may retrieve a copy of load balancing engine 320 (or software portions thereof) from storage and load it into memory. The processor may then iteratively execute the instructions of load balancing engine 320 to provide the desired method.

In another example, load balancing engine 320 includes logic executed on an ASIC, FPGA, or other low-level hardware device specifically programmed to carry out the functions of load balancing engine 320. In one case, any portions of load balancing engine 320 that are not hard-coded into the logic may be loaded from a firmware or similar memory. In this case, load-balancing engine 320 may operate without the benefit of an operating system, to improve speed and efficiency.

Load balancing engine 320 may also communicatively couple to a TCAM 329. TCAM 329 may be configured to provide high-speed searching as disclosed herein.

Figures 4, 5:
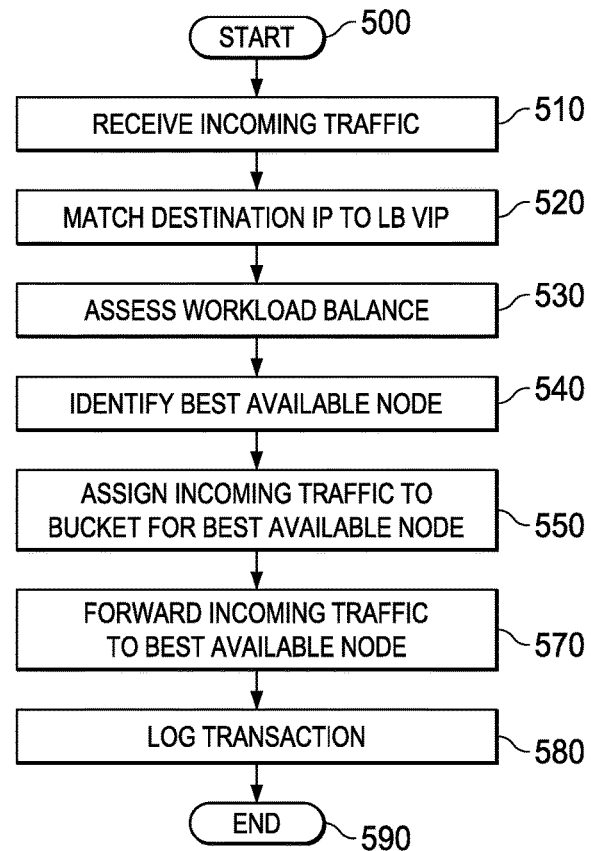
FIG. 4 is a block diagram of a routing table according to one or more examples of the present Specification.
FIG. 5 is a flow chart of a method performed by a switch according to one or more examples of the present Specification.

FIG. 4 is a block diagram of a routing table 400 according to one or more examples of the present Specification. In this example, four nodes are provided, designated node N0, N1, N2, and N3. Each node represents a server appliance having a unique VIP, whether a dedicated hardware server appliance or a virtual server appliance.

Load-balancing engine 320 designates 8 traffic buckets, labeled B0, B1, B2, B3, B4, B5, B6, and B7. Based on load and demand, load-balancing engine 320 maps each traffic bucket to an appropriate node. In this example, buckets B0 and B4 are mapped to node N0. Buckets B1 and B5 are mapped to node N1. Buckets B2 and B6 are mapped to node N2. Buckets B3 and B7 are mapped to node N3. These mappings are provided by way of nonlimiting example only, and are provided strictly to illustrate the principle of mapping buckets to nodes.

When switch 190 receives incoming traffic, load-balancing engine 320 operates to execute an appropriate algorithm for assigning the incoming traffic to a traffic bucket. This may include, for example, random or pseudorandom assignment, round robin scheduling, or any suitable scheduling algorithm. In one example, an algorithm may be based on the source IP address of the incoming packet, as described in more detail in connection with FIGS. 7 and 8.

After assigning the traffic to a bucket, switch 190 modifies the packet with the appropriate VIP for the node servicing that bucket, and forwards the packet.

When a response comes, switch 190 modifies the packet to reflect the publically visible IP address of switch 190, so that the load balancing is completely invisible to external hosts.

FIG. 5 is a flowchart of an example method 500 performed by load-balancing engine 320 according to one or more examples of the present Specification.

In block 510, switch 190 receives incoming traffic and provides the incoming traffic to load-balancing engine 320.

In block 520, switch 190 compares the destination IP of the incoming traffic to the VIP designated for load balancing. If there is a match, the incoming traffic is provided to load balancing engine 320 for load balancing. If not, then switch 190 simply routes or switches the traffic according to its normal function.

In block 530, load-balancing engine 320 assesses workload balance for available workload servers. As described above, this may be performed via round-robin assignment, random or pseudo-random assignment, or any other suitable load balancing algorithm.

In block 540, load-balancing engine 320 identifies the best available node for servicing the incoming traffic, based on the assessing of block 530.

In block 550, according to the identifying of block 540, load-balancing engine 320 assigns the incoming traffic to a bucket for the best available node. Assigning to a node may comprise modifying the header to reflect the VIP for the assigned node.

In block 570, after load-balancing engine 320 has assigned the traffic to an appropriate bucket and thereby to an appropriate node, switch 190 forwards the incoming traffic to the node designated for servicing that bucket, specifically by forwarding the traffic to the appropriate VIP.

In block 580, load-balancing engine 320 may log the transaction, as appropriate or necessary.

In block 590, the method is done.

Figure 6:
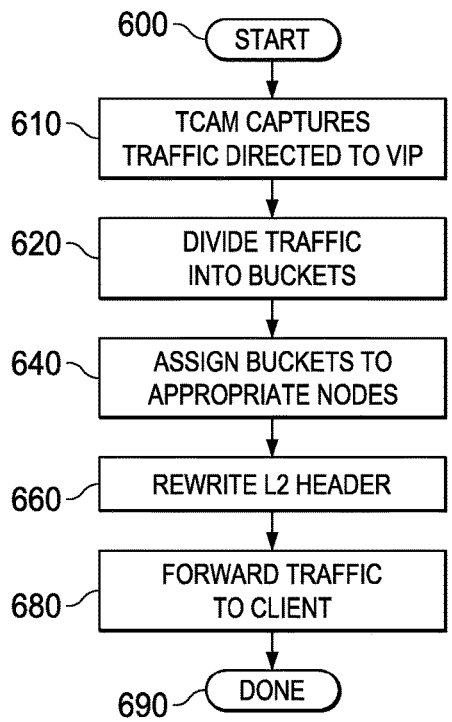
FIG. 6 is a flow chart of a method of load balancing according to one or more examples of the present Specification.

FIG. 6 illustrates a method of performing load balancing on a switch with the aid of a TCAM, such as TCAM 329 according to one or more examples of the present Specification. This example employs the notion of a flow. In an example, a flow is uniquely identified by a tuple T, comprising src-ip (source IP address), dst-ip (destination IP address), protocol, L4-src-port (layer 4 source port) and L4-dst-port (layer 4 destination port).

In an example, a client device 110-1 sends a packet directed to a VIP serviced by switch 190. By way of illustration, this flow is referred to as F1, and tuple T1 identifies flow F1. Tuple T1 comprises (Dev-110-1-IP, VIP, TCP, L4-src-port, L4-dest-port).

Similarly client device 110-2 initiates traffic to the same VIP. Since client 110-2's IP address is different from client 110-1's, this flow will have a different Tuple. By way of illustration, this is referred to as flow F2, identified by tuple T2. Tuple T2 comprises (Dev-110-2-IP, VIP, TCP, L4-src-port, L4-dest-port).

In various examples, sets of buckets may be part of a "pool," and one or more pools can be assigned to a single VIP, allowing VIP traffic to be load balanced among server nodes.

Referring now to method 600 in FIG. 6, it is assumed that switch 190 has now received flows F1 and F2.

In block 610, TCAM 329 looks up the IP address of VIP as it appears in both flows. In this example, both flows are directed to VIP, which is a virtual IP address for a service provided by servers in workload cluster 142. Thus, switch 190 can quickly determine that flows F1 and F2 are to be load balanced.

In block 620, load balancing engine 320 assigns each node to a traffic bucket as described herein. In certain examples, this may be accomplished by any of the load balancing algorithms disclosed herein, or by any other appropriate load balancing algorithm. In one example, assigning each flow to a bucket comprises assigning according to method 900 of FIG. 9, based on Dev-110-1-IP and Dev-110-2-IP respectively. In that case, TCAM 329 may include a table mapping masked IP address fragments to traffic buckets.

In block 640, load balancing engine 320 assigns each flow to a node for servicing, such as a workload server in workload cluster 142. This may be a deterministic assignment based on the traffic bucket that each flow was assigned to. For increased speed, this may also be performed using TCAM 329. For example, TCAM 329 may include a table mapping traffic buckets to service nodes.

In block 660, load balancing engine 320 rewrites the L2 header for the incoming packets. For example, assuming that flow F1 was assigned to service node 1 in workload cluster 142, and flow F2 was assigned to service node 2 in workload cluster 142, load balancing engine 320 rewrites the L2 headers for the packets in those flows to direct them to their respective service nodes.

In block 680, switch 190 is finished with its load balancing tasks, and now acts as a switch, switching or routing the packets to the nodes provided by their new L2 headers.

Blocks 610 through 680 are repeated for each incoming packet, with an appropriate bucket and service node being selected for each. Assuming a well-configured load balancing engine 320, packets will be well distributed across available service nodes in workload cluster 142 so that workload is optimally distributed across available service nodes.

Reverse traffic (response from service nodes to client devices) are delivered directly to the respective clients without any intervention from load balancing engine 320.

FIG. 7 is a block diagram of an L2 network 700 according to one or more examples of the present Specification. In the example of FIG. 7, L2 network 700 includes an L2 workload cluster 742, which is configured to service requests from clients 720. For example, L2 network 700 may be part of a corporate intranet, and traffic in this portion of the corporate intranet may be pure L2 traffic. This may be the case, for example, if workload cluster 742 provides support or "middleware" services, such as a database server.

L2 network 700 includes a switch 190, which may be configured with ITD capabilities, and which may receiving incoming L2 traffic on an L2 ingress interface. In this example, four unique flows are illustrated, denoted by a triangle, square, X, and circle respectively. Other traffic may also come in on the L2 interface, but for simplicity of the figure, is not shown here. L2 traffic destined for workload cluster 742 is to be examined by firewalls 760-1, 760-2, 760-3, and 760-4. Note that although four firewalls are shown in this illustration, many more may be provided in appropriate circumstances. Switch 190 may include an ITD instance that is to load balance ingress traffic to one of the four or more firewalls 760.

Switch 190 may select incoming traffic, including by one of the methods disclosed above, such as based on the L4 destination or VLAN. Any traffic not designated for load balancing to firewalls 760 may simply be passed to an appropriate egress interface (not shown), and may pass on to its intended subnetwork or VLAN. However, the selection process may also identify ingress traffic that is designated for workload cluster 742, and thus must be load balanced to firewalls 760. This may be referred to as the "selected traffic," (i.e., the traffic that remains after the selection process).

In this example, firewalls 760 may be transparent L2 nodes without a traditional IP address (usually found at L3 or above). Thus, the IP-address-based methods of load balancing discussed herein may not be appropriate for load balancing to firewalls 760. Rather, a non-IP address load balancing factor or criterion may be used instead. Several such load-balancing factors are discussed above. These load balancing factors are disclosed by way of nonlimiting example only, and it should be understood that in accordance with the methods of this Specification, any suitable load balancing factors may be used, including any useable load balancing factor other than IP address.

After firewalls 760 inspect the traffic, they may return the inspected traffic to switch 190. Switch 190 may then forward the traffic to workload cluster 742. Note that workload cluster 742 may itself include a plurality of workload servers, and these may be load balanced.

In certain cases, such as VLAN-based routing, ingress traffic is selected according to its VLAN. A VLAN-level ACL is applied for all ingress traffic. However, because the ACL may not differentiate between ingress and egress traffic, circular routing may occur on return traffic. Thus, a per-port exclusion may be provided, wherein the ingress port or ports are listed as excluded, thus ensuring that the traffic is not routed circularly. Per-port inclusion may also be used, in which case, all load balanced ports are provided on the include list.

FIG. 8 is a block diagram of a heterogeneous network 800 according to one or more examples of the present Specification. In this network, clients 820 sit behind an L3 interface into switch 190. However, workload cluster 842 operates at L2 as in L2 network 700 of FIG. 7, as do application firewalls 860. Thus, switch 190 includes both L2 and L3 interfaces.

In this example, incoming traffic arrives on an L3 interface, and then must be load balanced to applications firewalls 860-1, 860-2, 860-3, and 860-4. Four application firewalls are disclosed here by way of illustrative example, but this example is nonlimiting. Any suitable number of application firewalls 860 may be provided. Furthermore, application firewalls 860 are themselves only illustrative examples, and any other suitable network appliance or device could be used instead. In this example, application firewalls are configured to service applications provided by workload cluster 842.

When L3 traffic arrives on the L3 interface, switch 190 may translate the incoming traffic into L2 traffic. Either before or after translating the traffic, switch 190 may also select the incoming traffic, as discussed above. After selection, switch 190 may use an ITD instance to load balance selected traffic to application firewalls 860, which may be transparent L2 nodes without traditional IP addresses. Load balancing may be via a load balancing factor or criterion other than IP address, such as those listed above. These load balancing factors are disclosed by way of nonlimiting example only, and it should be understood that in accordance with the methods of this Specification, any suitable load balancing factors may be used, including any useable load balancing factor other than IP address.

When application firewalls 860 return traffic to switch 190, switch 190 may then distribute the traffic to workload cluster 842. As above, this may include sending the traffic to another switch 190, which may include an ITD instance to load balance the traffic to workload cluster 842. In other embodiments, switch 190 may include a second ITD instance configured to load balance traffic to workload cluster 842.

Figure 9:
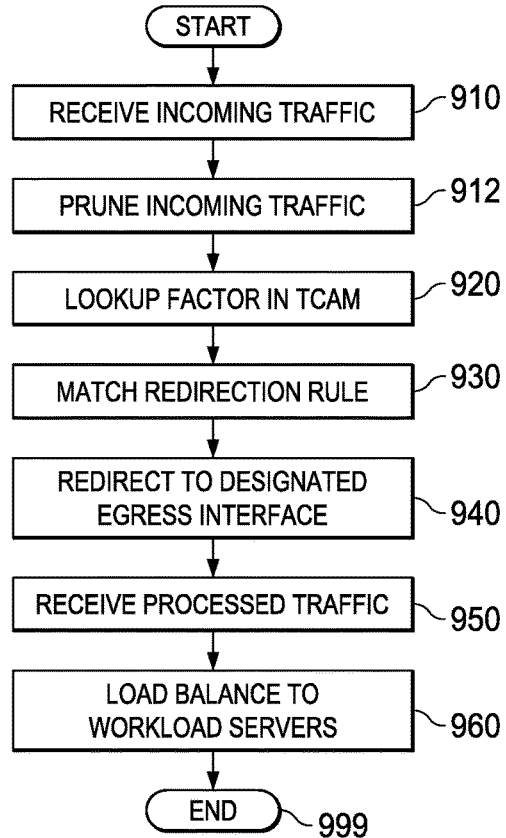
FIG. 9 is a block diagram of a mixed L2/Layer 3 (L3) network according to one or more examples of the present Specification.

FIG. 9 is a flow chart of a method 900 of load balancing according to one or more examples of the present Specification.

In block 910, switch 190 receives incoming traffic, which in appropriate circumstances may be any type of traffic, including L2 or L3 traffic. As necessary, switch 190 may translate the traffic from one layer to another.

In block 912, switch 190 selects the incoming traffic, such as above. Traffic not matching a selection criterion may be handled according to another function of switch 190, such as forwarding to a port or port group connected to another subnetwork or VLAN.

In block 920, load balancing engine 320 looks up an appropriate load balancing factor or criterion in TCAM 329. This may include a non-IP address factor, such as those listed above, or any other suitable factor.

In block 930, load balancing engine 320 matches a redirection rule, such as a rule that indicates which port to send the traffic to based on the load balancing factor. This may correspond to a specific appliance, such as a specific firewall or application firewall, or any other suitable appliance. This may be a transparent network appliance without a traditional IP address.

In block 940, load balancing engine 320 redirects the traffic to the appropriate egress interface based on its decision in block 930.

In block 950, switch 190 may receive back from the appliance processed traffic (e.g., traffic that has been inspected by a firewall).

In block 960, load balancing engine 320 (or a separate instance of a load balancing engine 320) may load balance the traffic to workload servers, such as workload servers 842. Note that this second instance of load balancing may be provided on the same switch 190, or on a separate switch 190 connected to a particular egress interface. Also note that in some instances, as discussed above, such as VLAN-based load balancing, include or exclude rules may need to be provided to ensure that traffic is not caught in a circular loop.

In block 999, the method is done.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 224 and/or switch 190 (e.g., through various modules, algorithms, processes, etc.). In some embodiments, one or more of these features may be implemented in hardware, provided external to these elements, or consolidated in any appropriate manner to achieve the intended functionality. Service appliance 224 and/or switch 190 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 190 and service appliance 224 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 392, memory 388) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 386 and processor 390 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in network infrastructure 200 can include one or more memory elements (e.g., memory 388, memory 392) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in network infrastructure 200 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, network infrastructure 200 may be applicable to other exchanges, formats, or routing protocols. Moreover, although network infrastructure 200 has been illustrated with reference to particular elements and operations that facilitate the communication process, these elements, and operations may be replaced by any suitable architecture or process that achieves the intended functionality of network infrastructure 200.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

By way of nonlimiting example, there is disclosed a network apparatus for providing native load balancing within a switch, comprising: a first network interface operable to communicatively couple to a first network; a plurality of second network interfaces operable to communicatively couple to a second network; first one or more logic elements comprising a switching engine operable for providing network switching; a content-addressable memory (CAM); and second one or more logic elements comprising a load balancing engine operable for: receiving incoming network traffic via the first network; and load balancing the incoming traffic to a first egress interface based at least in part on a load balancing factor other than an IP address.

There is further disclosed an example, wherein the switching engine is further operable for receiving the incoming traffic back from a device connected to the network apparatus and redirecting the traffic to a second egress interface.

There is further disclosed an example, wherein the device connected to the network apparatus is a physical or virtual network appliance.

There is further disclosed an example, wherein the device connected to the first egress interface is a firewall.

There is further disclosed an example, wherein the second egress interface is to connect to a physical or virtual workload server.

There is further disclosed an example, wherein receiving incoming network traffic via the first network comprises receiving the incoming traffic on a selected port number.

There is further disclosed an example, wherein receiving incoming network traffic via the first network comprises receiving the incoming traffic on a selected virtual local area network (VLAN).

There is further disclosed an example, wherein receiving incoming network traffic via the first network comprises receiving the incoming traffic on a selected virtual internet protocol (VIP) address.

There is further disclosed an example, wherein receiving incoming network traffic via the first network comprises receiving the incoming traffic on a selected protocol.

There is further disclosed method of providing native load balancing within a switch, comprising: communicatively coupling to a first network; communicatively coupling to a second network; providing network switching; and providing load balancing, comprising: receiving incoming network traffic via the first network; and load balancing the incoming traffic to a first egress interface based at least in part on a load balancing factor other than an IP address, comprising addressing a content addressable memory (CAM).

There is further disclosed an example, wherein providing network switching comprises receiving the incoming traffic back from a device connected to the network apparatus and redirecting the traffic to a second egress interface.

There is further disclosed an example, wherein the device connected to the network apparatus is a physical or virtual network appliance.

There is further disclosed an example, wherein the device connected to the first egress interface is a firewall.

There is further disclosed an example, wherein the second egress interface is to connect to a physical or virtual workload server.

There is further disclosed an example, wherein receiving incoming network traffic via the first network comprises receiving the incoming traffic on a selected port number.

There is further disclosed an example, wherein receiving incoming network traffic via the first network comprises receiving the incoming traffic on a selected virtual local area network (VLAN).

There is further disclosed an example, wherein receiving incoming network traffic via the first network comprises receiving the incoming traffic on a selected virtual internet protocol (VIP) address.

There is further disclosed an example, wherein receiving incoming network traffic via the first network comprises receiving the incoming traffic on a selected protocol There is further disclosed one or more tangible, non-transitory computer-readable mediums, including a content-addressable memory (CAM), having stored thereon executable instructions for providing native hardware-based load balancing, comprising: communicatively coupling to a first network; communicatively coupling to a second network; providing network switching; receiving incoming network traffic via the first network; and load balancing the traffic to the second network via a first egress interface based at least in part on a load balancing factor other than an IP address, comprising addressing a content-addressable memory (CAM).

There is further disclosed an example, wherein providing network switching comprises receiving the incoming traffic back from a device connected to the network apparatus and redirecting the traffic to a second egress interface Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke subsection (f) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A network apparatus for providing native load balancing within a switch, comprising:
    a first network interface operable to communicatively couple to a first network;
    a plurality of second network interfaces operable to communicatively couple to a second network;
    first one or more logic elements comprising a switching engine operable for providing network switching;
    a content-addressable memory (CAM); and
    second one or more logic elements comprising a load balancing engine operable for:
        receiving network traffic via the first network; and
        load balancing the network traffic to a Layer 2 egress interface without an Internet Protocol (IP) address, wherein the Layer 2 egress interface connects to a physical or virtual network appliance, based at least in part on a load balancing factor other than the IP address by:
            identifying an access control list corresponding to a port of the network apparatus at which the network traffic is received, wherein the access control list includes one or more bits of a source media access control address of the network traffic; and
            redirecting the network traffic to the Layer 2 egress interface based on the one or more specified bits in the source media access control address, wherein the switching engine is further operable for:
                receiving the network traffic back from the Layer 2 egress interface; and
                redirecting the network traffic to a second egress interface.

2. The network apparatus of claim 1, wherein the physical or virtual network appliance is a firewall.

3. The network apparatus of claim 1, wherein the second egress interface is to connect to a physical or virtual workload server.

4. The network apparatus of claim 1, wherein the load balancing engine is further operable for:
    determining a destination protocol and/or a destination port of further network traffic; and
    redirecting the further network traffic to the Layer 2 egress interface based on the destination protocol and/or the destination port of the further network traffic.

5. The network apparatus of claim 1, wherein the load balancing engine is further operable for:
    translating a virtual local area network of further network traffic based on a port of the network apparatus at which the further network traffic is received; and
    redirecting the further network traffic to the Layer 2 egress interface based on the translated virtual local area network.

6. The network apparatus of claim 1, wherein the load balancing engine is further operable for:
    retrieving a media access control address of the Layer 2 egress interface; and
    redirecting further network traffic to the Layer 2 egress interface based on the media access control address.

7. The network apparatus of claim 1, wherein the load balancing engine is further operable for:
    assigning a virtual IP address to further network traffic; and
    based on the virtual IP address, redirecting the further network traffic to the Layer 2 egress interface.

8. The network apparatus of claim 1, wherein the load balancing engine is further operable for:
    applying a virtual local area network access control list for further network traffic; and
    redirecting the further network traffic to the Layer 2 egress interface based on the virtual local area network access control list.

9. A method of providing native load balancing within a switch, comprising:
    communicatively coupling to a first network;
    communicatively coupling to a second network;
    providing load balancing, comprising:
        receiving network traffic via the first network;
        load balancing the network traffic to a Layer 2 egress interface without an Internet Protocol (IP) address, wherein the Layer 2 egress interface connects to a physical or virtual network appliance, based at least in part on a load balancing factor other than the IP address by:
            identifying an access control list corresponding to a port of the switch at which the network traffic is received, wherein the access control list includes one or more bits of a source media access control address of the network traffic; and
            redirecting the network traffic to the Layer 2 egress interface based on the one or more specified bits in the source media access control address; and
    providing network switching including:
        receiving the network traffic back from the Layer 2 egress interface; and
        redirecting the network traffic to a second egress interface.

10. The method of claim 9, wherein the physical or virtual network appliance is a firewall.

11. The method of claim 9, wherein the second egress interface is to connect to a physical or virtual workload server.

12. The method of claim 9, further comprising:
    applying a virtual local area network access control list for further network traffic; and
    redirecting the further network traffic to the Layer 2 egress interface based on the virtual local area network access control list.

13. The method of claim 9, further comprising:
assigning a virtual IP address to further network traffic; and
based on the virtual IP address, redirecting the further network traffic to the Layer 2 egress interface.

14. The method of claim 9, further comprising:
translating a virtual local area network of further network traffic based on a port at which the further network traffic is received; and
redirecting the further network traffic to the Layer 2 egress interface based on the translated virtual local area network.

15. The method of claim 9, further comprising:
retrieving a media access control address of the Layer 2 egress interface; and
redirecting further network traffic to the Layer 2 egress interface based on the media access control address.

16. The method of claim 9, further comprising:
determining a destination protocol and/or a destination port of further network traffic; and
redirecting the further network traffic to the Layer 2 egress interface based on the destination protocol and/or the destination port of the further network traffic.

17. One or more tangible, non-transitory computer-readable mediums having stored thereon executable instructions for providing native hardware-based load balancing, comprising:
communicatively coupling to a first network;
communicatively coupling to a second network;
providing load balancing, comprising:
receiving network traffic via the first network; and
load balancing the network traffic to a Layer 2 egress interface without an Internet Protocol (IP) address, wherein the Layer 2 egress interface connects to a physical or virtual network appliance, based at least in part on a load balancing factor other than the IP address by:
identifying an access control list corresponding to a port at which the network traffic is received, wherein the access control list includes one or more bits of a source media access control address of the network traffic; and
redirecting the network traffic to the Layer 2 egress interface based on the one or more specified bits in the source media access control address; and
providing network switching including:
receiving the network traffic back from the Layer 2 egress interface; and
redirecting the network traffic to a second egress interface.

18. The one or more tangible, non-transitory computer-readable mediums of claim 17, wherein the physical or virtual network appliance is a firewall.

19. The one or more tangible, non-transitory computer-readable mediums of claim 17, wherein the second egress interface is to connect to a physical or virtual workload server.

20. The one or more tangible, non-transitory computer-readable mediums of claim 17, further comprising instructions for:
applying a virtual local area network access control list for further network traffic; and
redirecting the further network traffic to the Layer 2 egress interface based on the virtual local area network access control list.

* * * * *